(12) United States Patent
Weinstein et al.

(10) Patent No.: US 12,228,440 B2
(45) Date of Patent: Feb. 18, 2025

(54) DETERMINING A VAPOR PRESSURE USING A VAPOR PRESSURE METER FACTOR

(71) Applicant: MICRO MOTION, INC., Boulder, CO (US)

(72) Inventors: Joel Weinstein, Boulder, CO (US); David Martinez Morett, Ft. Collins, CO (US)

(73) Assignee: MICRO MOTION, INC., Boulder, CO (US)

( * ) Notice: Subject to any disclaimer, the term of this patent is extended or adjusted under 35 U.S.C. 154(b) by 466 days.

(21) Appl. No.: 17/440,455

(22) PCT Filed: Apr. 3, 2019

(86) PCT No.: PCT/US2019/025537
§ 371 (c)(1),
(2) Date: Sep. 17, 2021

(87) PCT Pub. No.: WO2020/204921
PCT Pub. Date: Oct. 8, 2020

(65) Prior Publication Data
US 2022/0146295 A1 May 12, 2022

(51) Int. Cl.
*G01F 1/84* (2006.01)
*G01F 15/00* (2006.01)
*G01F 15/063* (2022.01)
*G01L 9/00* (2006.01)
(Continued)

(52) U.S. Cl.
CPC .......... *G01F 1/8436* (2013.01); *G01F 1/8413* (2013.01); *G01F 15/005* (2013.01); *G01F 15/063* (2013.01); *G01L 9/0008* (2013.01); *G01L 15/00* (2013.01); *G01N 7/14* (2013.01)

(58) Field of Classification Search
CPC ........ G01F 1/8436; G01F 1/8413; G01F 1/80; G01F 15/005; G01F 15/063; G01L 9/0008; G01L 15/00; G01N 7/14
See application file for complete search history.

(56) References Cited

U.S. PATENT DOCUMENTS 4,667,508 A * 5/1987 Soderstrom, III ... B01D 3/4227
203/1
4,905,505 A * 3/1990 Reed ........................ G01N 7/00
73/64.46
(Continued)

FOREIGN PATENT DOCUMENTS

CN 104535128 A 4/2015
WO 2017135954 A1 8/2017

*Primary Examiner* — Farhana A Hoque
*Assistant Examiner* — Joseph O Nyamogo
(74) *Attorney, Agent, or Firm* — The Ollila Law Group LLC (57) ABSTRACT

A meter electronics (20) for determining a vapor pressure using a vapor pressure meter factor is provided. The meter electronics (20) comprises a processing system (200) communicatively coupled to a meter assembly (10). The processing system (200) is configured to provide a drive signal to the meter assembly (10) having a fluid, measure a drive gain of the drive signal provided to the meter assembly (10), and determine the vapor pressure of the fluid based on a previously determined relationship between the drive gain and a reference gas-liquid ratio.

17 Claims, 7 Drawing Sheets

(51) Int. Cl.
   *G01L 15/00* (2006.01)
   *G01N 7/14* (2006.01)

(56) References Cited

U.S. PATENT DOCUMENTS

| | | | | |
|---|---|---|---|---|
| 5,637,791 | A * | 6/1997 | Alonso | G01N 7/00 |
| | | | | 73/64.45 |
| 6,499,476 | B1 * | 12/2002 | Reddy | F02D 41/0045 |
| | | | | 123/704 |
| 10,620,027 | B2 | 4/2020 | Schollenberger et al. | |
| 10,704,945 | B2 | 7/2020 | Wiklund et al. | |
| 2002/0184940 | A1 | 12/2002 | Storm et al. | |
| 2011/0220213 | A1 | 9/2011 | Cabrera et al. | |
| 2014/0039814 | A1 | 2/2014 | Paul et al. | |
| 2014/0076408 | A1 * | 3/2014 | Zimmer | F17D 1/20 |
| | | | | 137/487 |
| 2016/0041052 | A1 | 2/2016 | Fogarty et al. | |
| 2016/0252380 | A1 | 9/2016 | Henry et al. | |
| 2016/0305614 | A1 * | 10/2016 | Cabrera | G01F 15/026 |
| 2018/0003538 | A1 | 1/2018 | Schollenberger et al. | |

* cited by examiner

DETERMINING A VAPOR PRESSURE USING A VAPOR PRESSURE METER FACTOR

TECHNICAL FIELD

The embodiments described below relate to determining a vapor pressure and, more particularly, determining a vapor pressure using a vapor pressure meter factor.

BACKGROUND

Vibrating sensors, such as for example, vibrating densitometers and Coriolis flowmeters are generally known, and are used to measure mass flow and other information for materials flowing through a conduit in the flowmeter. Exemplary Coriolis flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no-flow through the flowmeter, a driving force applied to the conduit(s) causes all points along the conduit(s) to oscillate with identical phase or a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and determine a mass flow rate and other properties of a material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired flow tube amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage.

Vapor pressure is an important property in applications which handle flow and storage of volatile fluids such as gasoline, natural gas liquids, and liquid petroleum gas. Vapor pressure provides an indication of how volatile fluids may perform during handling, and further indicates conditions under which bubbles will likely form and pressure will likely build. As such, vapor pressure measurement of volatile fluids increases safety and prevents damage to transport vessels and infrastructure. For example, if the vapor pressure of a fluid is too high, cavitation during pumping and transfer operations may occur. Furthermore, vessel or process line vapor pressure may potentially rise beyond safe levels due to temperature changes. It is therefore often required that vapor pressure be known prior to storage and transport.

Typically, a vapor pressure is determined by capturing samples and removing them to a laboratory for testing to determine the value from the sample. This poses difficult issues for regulatory fuel quality standards enforcement because of the delay in obtaining final results, the cost of maintaining a lab, and the safety and legal evidence vulnerabilities associated with sample handling. A need therefore exists for an in-line device or system that can determine a vapor pressure of a fluid in a meter assembly on a continuous, real-time, basis under process conditions. This is provided by the present embodiments, and an advance in the art is achieved. On-site measurement is more reliable, as it obviates the need for the periodic sampling and fully eliminates the risk of fluid property changes between the time of sample collection and laboratory assay. Furthermore, safety is improved by having real-time measurements, as unsafe conditions may be remedied immediately. Additionally, money is saved, as regulatory enforcement may be conducted via simple on-site checks, wherein inspection and enforcement decisions may be made with little delay or process cessation. These benefits may be enhanced by accurately determining the vapor pressure.

SUMMARY

A meter electronics for determining a vapor pressure using a vapor pressure meter factor is provided. According to an embodiment, the meter electronics comprises a processing system communicatively coupled to a meter assembly. The processing system is configured to provide a drive signal to the meter assembly having a fluid, measure a drive gain of the drive signal provided to the meter assembly, and determine the vapor pressure of the fluid based on a previously determined relationship between the drive gain and a reference gas-liquid ratio.

A method of determining a vapor pressure using a vapor pressure meter factor is provided. According to an embodiment, the method comprises providing a drive signal to the meter assembly having a fluid, measuring a drive gain of the drive signal provided to the meter assembly, and determining the vapor pressure of the fluid based on a previously determined relationship between the drive gain and a reference gas-liquid ratio.

A method of determining a vapor pressure meter factor for determining a vapor pressure is provided. According to an embodiment, the method comprises determining a static pressure of a fluid in a meter assembly and determining a difference between the static pressure and a true vapor pressure of the fluid.

Aspects

According to an aspect, a meter electronics (20) for determining a vapor pressure using a vapor pressure meter factor comprises a processing system (200) communicatively coupled to a meter assembly (10). The processing system (200) is configured to provide a drive signal to the meter assembly (10) having a fluid, measure a drive gain of the drive signal provided to the meter assembly (10), and determine the vapor pressure of the fluid based on a previously determined relationship between the drive gain and a reference gas-liquid ratio.

Preferably, the meter electronics (20) is further configured to determine a static pressure of a fluid in the meter assembly (10) contemporaneous to when the drive gain is measured.

Preferably, the vapor pressure is determined using the measured drive gain and the previously determined relationship between the drive gain and the reference gas-liquid ratio.

Preferably, the previously determined relationship between the drive gain and the reference gas-liquid ratio is a linear function relating a 100 percent drive gain and a true vapor pressure drive gain.

Preferably, at least one of the reference gas-liquid ratio and the measured drive gain is associated with a predetermined threshold for detection of a fluid phase change.

Preferably, the determined vapor pressure is a true vapor pressure.

Preferably, the meter electronics (20) is further configured to use the true vapor pressure to determine a Reid vapor pressure.

According to an aspect, a method of determining a vapor pressure using a vapor pressure meter factor comprises providing a drive signal to the meter assembly having a fluid, measuring a drive gain of the drive signal provided to the meter assembly, and determining the vapor pressure of the fluid based on a previously determined relationship between the drive gain and a reference gas-liquid ratio.

Preferably, the method further comprises determining a static pressure of a fluid in the meter assembly contemporaneous to when the drive gain is measured.

Preferably, the vapor pressure is determined using the measured drive gain and the previously determined relationship between the drive gain and the reference gas-liquid ratio.

Preferably, the previously determined relationship between the drive gain and the reference gas-liquid ratio is a linear function relating a 100 percent drive gain and a true vapor pressure drive gain.

Preferably, at least one of the reference gas-liquid ratio and the measured drive gain is associated with a predetermined threshold for detection of a fluid phase change.

Preferably, the determined vapor pressure is a true vapor pressure.

Preferably, the method further comprises using the true vapor pressure to determine a Reid vapor pressure.

According to an aspect, a method of determining a vapor pressure meter factor for determining a vapor pressure comprises determining a static pressure of a fluid in a meter assembly and determining a difference between the static pressure and a true vapor pressure of the fluid.

Preferably, the method further comprises providing a drive signal to the meter assembly, measuring a drive gain of the drive signal provided to the meter assembly, and associating the static pressure of the fluid in the meter assembly with the drive gain.

Preferably, the method further comprises associating a drive gain threshold for detecting a phase change in the fluid with a measured drive gain, and associating the difference with the drive gain threshold.

BRIEF DESCRIPTION OF THE DRAWINGS

The same reference number represents the same element on all drawings. It should be understood that the drawings are not necessarily to scale.

DETAILED DESCRIPTION

FIGS. 1-7 and the following description depict specific examples to teach those skilled in the art how to make and use the best mode of embodiments of determining a vapor pressure using a vapor pressure meter factor. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of determining the vapor pressure using the vapor pressure meter factor. As a result, the embodiments described below are not limited to the specific examples described below, but only by the claims and their equivalents.

Figure 1:
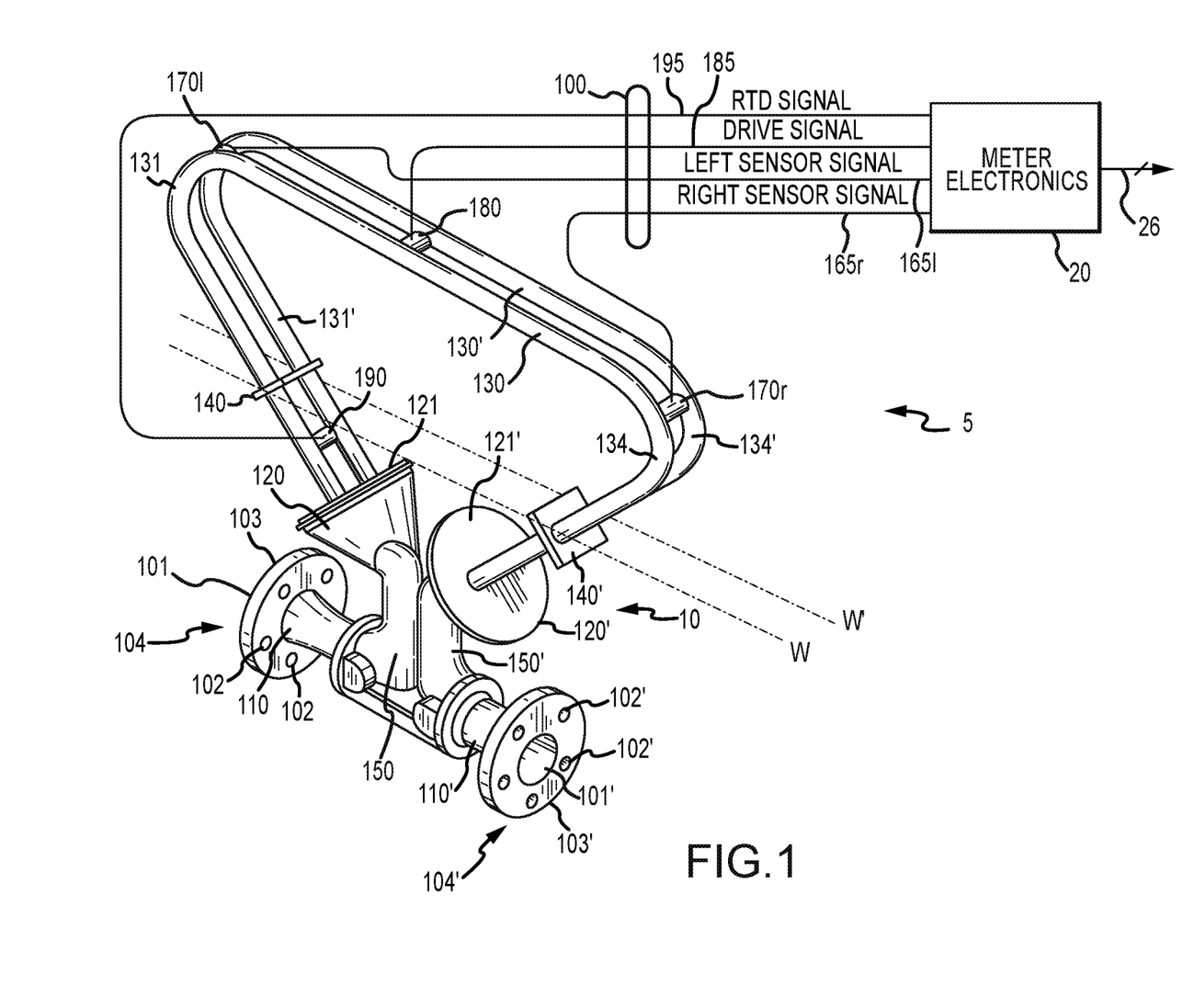
FIG. 1 shows a vibratory meter 5.

FIG. 1 shows a vibratory meter 5. As shown in FIG. 1, the vibratory meter 5 comprises a meter assembly 10 and meter electronics 20. The meter assembly 10 responds to mass flow rate and density of a process material. The meter electronics 20 is connected to the meter assembly 10 via leads 100 to provide density, mass flow rate, temperature information over path 26, and/or other information.

The meter assembly 10 includes a pair of manifolds 150 and 150', flanges 103 and 103' having flange necks 110 and 110', a pair of parallel conduits 130 and 130', driver 180, resistive temperature detector (RTD) 190, and a pair of pickoff sensors 170l and 170r. Conduits 130 and 130' have two essentially straight inlet legs 131, 131' and outlet legs 134, 134', which converge towards each other at conduit mounting blocks 120 and 120'. The conduits 130, 130' bend at two symmetrical locations along their length and are essentially parallel throughout their length. Brace bars 140 and 140' serve to define the axis W and W' about which each conduit 130, 130' oscillates. The legs 131, 131' and 134, 134' of the conduits 130, 130' are fixedly attached to conduit mounting blocks 120 and 120' and these blocks, in turn, are fixedly attached to manifolds 150 and 150'. This provides a continuous closed material path through meter assembly 10.

When flanges 103 and 103', having holes 102 and 102' are connected, via inlet end 104 and outlet end 104' into a process line (not shown) which carries the process material that is being measured, material enters inlet end 104 of the meter through an orifice 101 in the flange 103 and is conducted through the manifold 150 to the conduit mounting block 120 having a surface 121. Within the manifold 150 the material is divided and routed through the conduits 130, 130'. Upon exiting the conduits 130, 130', the process material is recombined in a single stream within the mounting block 120' having a surface 121' and the manifold 150' and is thereafter routed to outlet end 104' connected by the flange 103' having holes 102' to the process line (not shown).

The conduits 130, 130' are selected and appropriately mounted to the conduit mounting blocks 120, 120' so as to have substantially the same mass distribution, moments of inertia and Young's modulus about bending axes W-W and W'-W', respectively. These bending axes go through the brace bars 140, 140'. Inasmuch as the Young's modulus of the conduits change with temperature, and this change affects the calculation of flow and density, RTD 190 is mounted to conduit 130' to continuously measure the temperature of the conduit 130'. The temperature of the conduit 130' and hence the voltage appearing across the RTD 190 for a given current passing therethrough is governed by the temperature of the material passing through the conduit 130'. The temperature dependent voltage appearing across the RTD 190 is used in a well-known method by the meter electronics 20 to compensate for the change in elastic modulus of the conduits 130, 130' due to any changes in conduit temperature. The RTD 190 is connected to the meter electronics 20 by lead 195.

Both of the conduits 130, 130' are driven by driver 180 in opposite directions about their respective bending axes W and W' and at what is termed the first out-of-phase bending mode of the flow meter. This driver 180 may comprise any one of many well-known arrangements, such as a magnet mounted to the conduit 130' and an opposing coil mounted to the conduit 130 and through which an alternating current is passed for vibrating both conduits 130, 130'. A suitable drive signal is applied by the meter electronics 20, via lead 185, to the driver 180.

The meter electronics 20 receives the RTD temperature signal on lead 195, and the left and right sensor signals appearing on leads 100 carrying the left and right sensor signals 165l, 165r, respectively. The meter electronics 20 produces the drive signal appearing on lead 185 to driver 180 and vibrate conduits 130, 130'. The meter electronics 20 processes the left and right sensor signals and the RTD signal to compute the mass flow rate and the density of the material passing through meter assembly 10. This information, along with other information, is applied by meter electronics 20 over path 26 as a signal.

A mass flow rate measurement $\dot{m}$ can be generated according to the equation:

$$\dot{m} = FCF[\Delta t - \Delta t_0] \quad [1]$$

The $\Delta t$ term comprises an operationally-derived (i.e., measured) time delay value comprising the time delay existing between the pick-off sensor signals, such as where the time delay is due to Coriolis effects related to mass flow rate through the vibratory meter 5. The measured $\Delta t$ term ultimately determines the mass flow rate of the flow material as it flows through the vibratory meter 5. The $\Delta t_0$ term comprises a time delay at zero flow calibration constant. The $\Delta t_0$ term is typically determined at the factory and programmed into the vibratory meter 5. The time delay at zero flow $\Delta t_0$ term will not change, even where flow conditions are changing. The flow calibration factor FCF is proportional to the stiffness of the vibratory meter 5.

Pressures in a Fluid in a Vibratory Meter

Assuming an incompressible liquid under steady conditions, the rate at which mass enters a control volume (e.g., a pipe) at an inlet ($\dot{m}_1$) equals the rate at which it leaves at an outlet ($\dot{m}_3$). This principle that the inlet mass flow rate ($\dot{m}_1$) must be equal to the outlet mass flow rate ($\dot{m}_3$) is illustrated by equation [2] below. Moving from the inlet to the outlet, the mass flow rate is conserved at each point along the pipe. However, there may be a reduction in a flow area midway between the inlet and the outlet. This reduction in the flow area requires that the velocity of the fluid increase (v↑) to maintain the same mass flow rate and obey conservation of mass principles.

$$\dot{m}_1 = \rho_1 v_1 A_1 = \rho_2 v_2 A_2 = \dot{m}_2 = \dot{m}_3; \quad [2]$$

where:
$\dot{m}$ is a mass flow rate of the fluid;
v is an average fluid velocity;
$\rho$ is a density of the fluid;
A is a total cross-sectional area;
subscript 1 indicates the inlet;
subscript 3 indicates the outlet; and
subscript 2 indicates midway between the inlet and the outlet.

Additionally, the total pressure in a flow system is equal to the sum of both the dynamic pressure and the static pressure:

$$P_{total} = P_{static} + P_{dynamic} \quad [3]$$

The dynamic pressure $P_{dynamic}$ may be defined as:

$$P_{dynamic} = \frac{\rho v^2}{2}; \quad [4]$$

where the terms $\rho$ and v are defined above with respect to equation [2].

Assuming steady, incompressible, inviscid, irrotational flow, the Bernoulli equation gives:

$$\text{Constant} = \frac{\rho v^2}{2} + \rho g z + P; \quad [5]$$

Where P refers to the static pressure and the $\rho g z$ term accounts for hydrostatic head due to elevation changes. More specifically, g is a gravitational constant and z is a height. The viscous portion of pressure drop can be handled with a separate loss term in the Bernoulli equation.

$$\Delta P_{viscous} = -\frac{\rho v^2}{2} \frac{fL}{D}; \quad [6]$$

where;
f is a friction factor;
L is a length of a pipe; and
D is a diameter of the pipe.

The below equation [7] is a version of the Bernoulli equation that accounts for frictional losses associated with traveling through a pipe. As fluid travels through the pipe, the fluid dissipates energy and the pressure drops across a given length of pipe. This loss in pressure is unrecoverable because energy from the fluid has been consumed through frictional losses. Accordingly, the following equation may account for this loss:

$$P_1 + \frac{\rho v_1^2}{2} + \rho g z_1 + \Delta P_{viscous} = P_2 + \frac{\rho v_2^2}{2} + \rho g z_2 \quad [7]$$

This relationship can be applied to the exemplary pipe described above with reference to equation [2]. When the fluid moves from the inlet to midway between the inlet and the outlet, there is a change in velocity to conserve the mass flow rate. Therefore, in maintaining the relationship shown in equation [7], the dynamic pressure $$\frac{\rho v^2}{2}$$

increases, causing the static pressure to decrease. As the fluid moves to the outlet from midway between the inlet and outlet, the static pressure is recovered through the same principles. That is, moving to the outlet from midway between the inlet and the outlet, the flow area is increased; therefore, the fluid velocity is decreased, causing the dynamic pressure to decrease while recovering part of the initial static pressure. However, the static pressure at the outlet will be lower due to unrecoverable viscous losses.

This can cause the static pressures at the inlet and outlet to be greater than a vapor pressure of the fluid, while a static pressure between the inlet and outlet is less than the vapor pressure of the fluid. As a result, although the static pressures at the inlet and the outlet are both greater than the vapor pressure of the fluid, flashing or outgassing may still occur in the pipe. Additionally, a vibratory meter, such as a Coriolis meter, may be inserted into a pipeline that has a diameter that is different than a diameter of a conduit or conduits in the vibratory meter. As a result, when outgassing is detected in the vibratory meter, the pressure measured in the pipeline may not be a vapor pressure of the fluid in the vibratory meter.

Meter Electronics—Drive Gain

Figure 2:
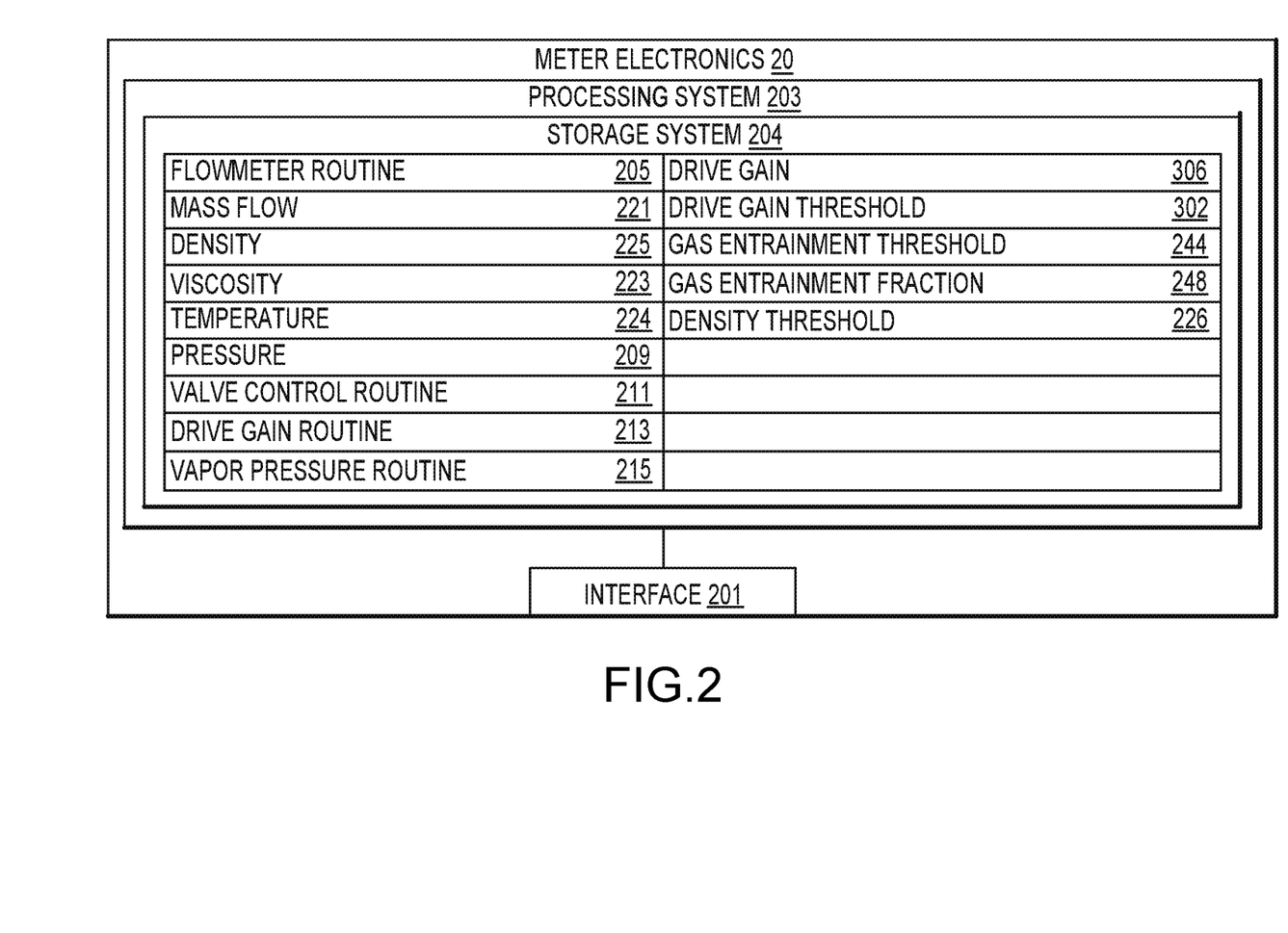
FIG. 2 is a block diagram of the meter electronics 20 of vibratory meter 5.

FIG. 2 is a block diagram of the meter electronics 20 of vibratory meter 5. In operation, the vibratory meter 5 provides various measurement values that may be outputted including one or more of a measured or averaged value of mass flow rate, volume flow rate, individual flow component mass and volume flow rates, and total flow rate, including, for example, both volume and mass flow of individual flow components.

The vibratory meter 5 generates a vibrational response. The vibrational response is received and processed by the meter electronics 20 to generate one or more fluid measurement values. The values can be monitored, recorded, saved, totaled, and/or output. The meter electronics 20 includes an interface 201, a processing system 203 in communication with the interface 201, and a storage system 204 in communication with the processing system 203. Although these components are shown as distinct blocks, it should be understood that the meter electronics 20 can be comprised of various combinations of integrated and/or discrete components.

The interface 201 is configured to communicate with the meter assembly 10 of the vibratory meter 5. The interface 201 may be configured to couple to the leads 100 (see FIG. 1) and exchange signals with the driver 180, pickoff sensors 170*l* and 170*r*, and RTDs 190, for example. The interface 201 may be further configured to communicate over the communication path 26, such as to external devices.

The processing system 203 can comprise any manner of processing system. The processing system 203 is configured to retrieve and execute stored routines in order to operate the vibratory meter 5. The storage system 204 can store routines including a flowmeter routine 205, a valve control routine 211, a drive gain routine 213, and a vapor pressure routine 215. The storage system 204 can store measurements, received values, working values, and other information. In some embodiments, the storage system stores a mass flow (m) 221, a density (ρ) 225, a density threshold 226, a viscosity (μ) 223, a temperature (T) 224, a pressure 209, a drive gain 306, a drive gain threshold 302, a gas entrainment threshold 244, a gas entrainment fraction 248, and any other variables known in the art. The routines 205, 211, 213, 215 may comprise any signal noted and those other variables known in the art. Other measurement/processing routines are contemplated and are within the scope of the description and claims.

As can be appreciated, more or fewer values may be stored in the storage system 204. For example, a vapor pressure may be determined without using the viscosity 223. For example, estimate viscosity based on a pressure drop, or a function relating friction as a function of flow rate. However, the viscosity 223 may be used to calculate a Reynolds number which can then be used to determine a friction factor. The Reynolds number and friction factor can be employed to determine a viscous pressure drop in a conduit, such as the conduits 130, 130' described above with reference to FIG. 1. As can be appreciated, the Reynolds number may not necessarily be employed.

The flowmeter routine 205 can produce and store fluid quantifications and flow measurements. These values can comprise substantially instantaneous measurement values or can comprise totalized or accumulated values. For example, the flowmeter routine 205 can generate mass flow measurements and store them in the mass flow 221 storage of the storage system 204, for example. The flowmeter routine 205 can generate density 225 measurements and store them in the density 225 storage, for example. The mass flow 221 and density 225 values are determined from the vibrational response, as previously discussed and as known in the art. The mass flow and other measurements can comprise a substantially instantaneous value, can comprise a sample, can comprise an averaged value over a time interval, or can comprise an accumulated value over a time interval. The time interval may be chosen to correspond to a block of time during which certain fluid conditions are detected, for example a liquid-only fluid state, or alternatively, a fluid state including liquids and entrained gas. In addition, other mass and volume flow and related quantifications are contemplated and are within the scope of the description and claims.

A drive gain threshold 302 may be used to distinguish between periods of flow, no flow, a monophasic/biphasic boundary (where a fluid phase change occurs), and gas entrainment/mixed-phase flow. Similarly, a density threshold 226 applied to the density reading 225 may also be used, separately or together with the drive gain 306, to distinguish gas entrainment/mixed-phase flow. Drive gain 306 may be utilized as a metric for the sensitivity of the vibratory meter's 5 conduit vibration to the presence of fluids of disparate densities, such as liquid and gas phases, for example, without limitation.

As used herein, the term drive gain refers to a measure of the amount of power needed to drive the flow tubes to specified amplitude, although any suitable definition may be employed. For example, the term drive gain may, in some embodiments, refer to drive current, pickoff voltage, or any signal measured or derived that indicates the amount of power needed to drive the flow conduits 130, 130' at a particular amplitude. The drive gain may be used to detect multi-phase flow by utilizing characteristics of the drive gain, such as, for example, noise levels, standard deviation of signals, damping-related measurements, and any other means known in the art to detect mixed-phase flow. These metrics may be compared across the pick-off sensors 170l and 170r to detect a mixed-phase flow.

Detecting a Phase Change of a Fluid

Figure 3:
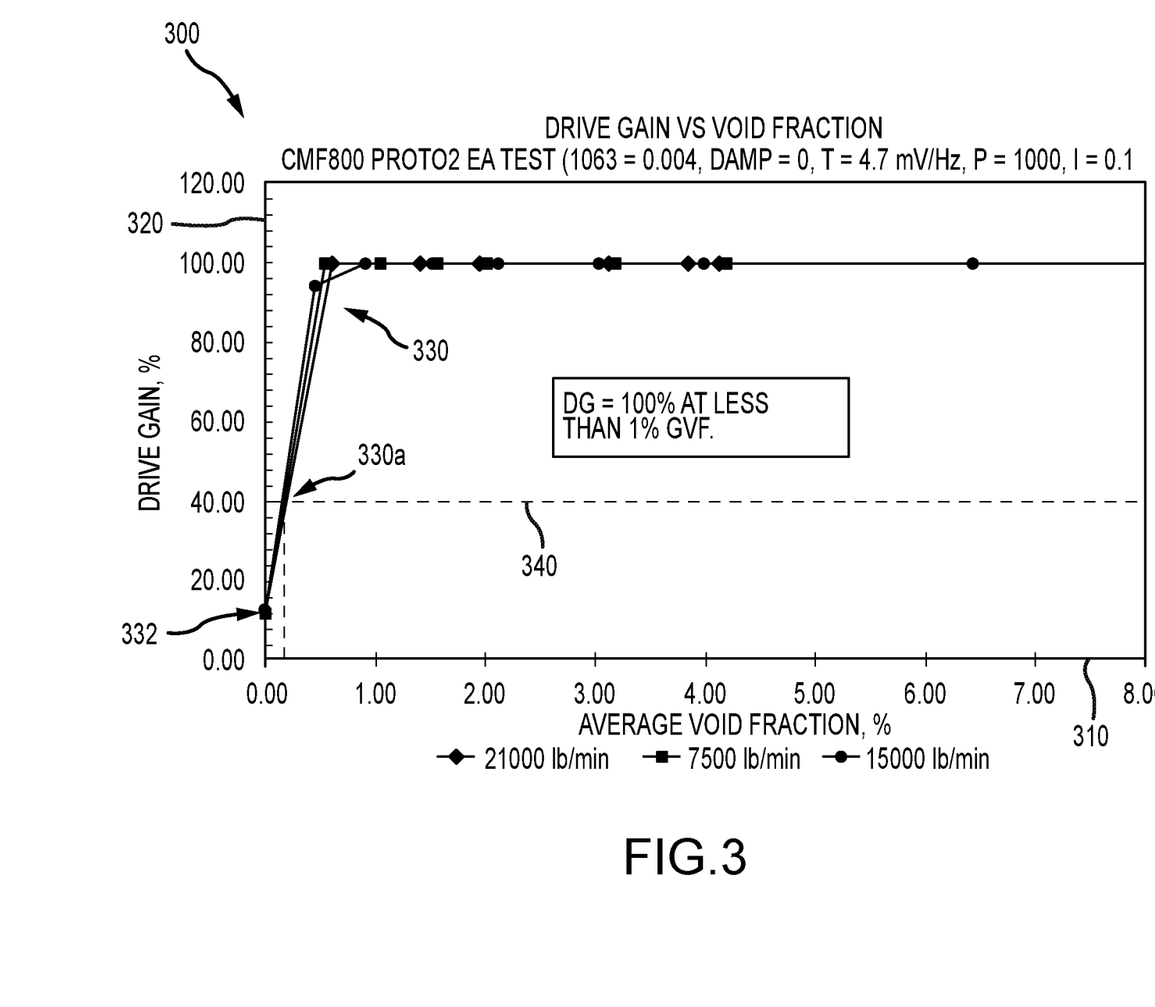
FIG. 3 shows a graph 300 illustrating a relationship between a drive gain and a gas-liquid ratio that can be used to determine a vapor pressure using a vapor pressure meter factor.

FIG. 3 shows a graph 300 illustrating a relationship between a drive gain and a gas-liquid ratio that can be used to determine a vapor pressure using a vapor pressure meter factor. As shown in FIG. 3, the graph 300 includes an average void fraction axis 310 and a drive gain axis 320. The average void fraction axis 310 and the drive gain axis 320 are incremented in percentages, although any suitable units and/or ratios may be employed.

The graph 300 includes plots 330 that are relationships between drive gains and gas-liquid ratios for various flow rates. As shown, the gas-liquid ratio is an average void fraction value of the plots 330, although any suitable gas-liquid ratio, such as a gas volume fraction ("GVF") or a gas entrainment fraction, may be employed, and may be based on volume, cross-sectional area, or the like. As can be appreciated, the plots 330 are similar despite being associated with different flow rates. Also shown is a drive gain threshold line 340 that intersects with the plots 330 at about 0.20 percent average void fraction, which may be a reference average void fraction 330a that corresponds to a 40% drive gain. Also shown is a true vapor pressure drive gain 332, which is about 10%. The true vapor pressure drive gain 332 corresponds to the fluid in the meter assembly that has a static pressure at which a fluid phase change occurs and has a gas-liquid ratio of zero.

As can be seen, the plots 330 vary from a drive gain of about 10 percent to drive gain of about 100 percent over a range of average void fractions from 0.00 percent to about 0.60 percent. As can be appreciated, a relatively small change in the average void fraction results in a significant change in the drive gain. This relatively small change can ensure that the onset of vapor formation can be accurately detected with the drive gain.

Although the drive gain of 40% is shown as corresponding to an average void fraction of 0.20 percent, the correspondence may be specific to a process. For example, the drive gain of 40% may correspond to other average void fractions in other process fluids and conditions. Different fluids may have different vapor pressures and therefore onset of vapor formation for the fluids may occur at different flow rates. That is, a fluid with a relatively low vapor pressure will vaporize at higher flow rates and a fluid with relatively high vapor pressure may vaporize at lower flow rates.

As can also be appreciated, the drive gain threshold line 340 may be at alternative/other drive gains. However, it may be beneficial to have the drive gain at 40% to eliminate false detections of entrainment/mixed phase flow while also ensuring that the onset of vapor formation is correctly detected.

Also, the plots 330 employ a drive gain, but other signals may be used, such as a measured density, or the like. The measured density may increase or decrease due to the presence of voids in the fluid. For example, the measured density may, counterintuitively, increase due to voids in relatively high frequency vibratory meters because of a velocity-of-sound effect. In relatively low frequency meters, the measured density may decrease due to the density of the voids being less than the fluid. These and other signals may be used alone or in combination to detect the presence of the vapor in the meter assembly.

As discussed above, the 0.20 percent average void fraction value may be the reference average void fraction 330a that corresponds to the 40 percent drive gain value, which may be where the drive gain threshold line 340 intersects with the drive gain axis 320. Accordingly, when a measured drive gain is at 40 percent for a fluid in a meter assembly, such as the meter assembly 10 described above, then an average void fraction of the fluid may be about 0.20 percent. The void fraction of about 0.20 percent may correspond to a pressure of the fluid due to gas present in the fluid. For example, the void fraction of about 0.20 percent may correspond to, for example, a static pressure value.

Due to the previously determined relationship between the drive gain, or other signal, such as density, and the reference average void fraction 330a, which may be a reference gas-liquid ratio, a vapor pressure value may be associated with a vapor pressure meter factor. For example, the meter assembly may be vibrated while a static pressure is increased or decreased until a fluid phase change is detected. A vapor pressure value may then be determined from the static pressure, as will be described in more detail in the following with reference to FIG. 4. The determined vapor pressure value may correspond to, for example, the static pressure at the drive gain threshold line 340. This determined vapor pressure value may be adjusted by the vapor pressure meter factor to correspond to the true vapor pressure drive gain 332, which is where a phase change occurs, or the monophasic/biphasic boundary is encountered. Accordingly, although the presence of gas in the fluid may be detected at a static pressure that is different than the true vapor pressure of the fluid, the true vapor pressure value may nevertheless be determined.

Using the reference average void fraction 330a as an example, the static pressure in the meter assembly may be reduced until the drive gain reaches 40 percent, thereby indicating that the fluid in the meter assembly has an average void fraction of 0.20 percent. A processing system, such as the processing system 203 described above, may determine that the fluid began to vaporize at a static pressure that is, for example, proportionally higher than the static pressure corresponding to the 40 percent drive gain. For example, a true vapor pressure value may be associated with a drive gain of about 10%. As can be appreciated, due to uncertainties involved in calculating the static pressure (e.g., errors from a pressure sensor, flow rate measurement errors, etc.) a true vapor pressure may be proportionally lower than the calculated static pressure that is associated with the 40% drive gain. True vapor pressure corresponds to a static pressure of the fluid where a fluid phase change occurs, but the gas-liquid ratio is zero.

Thus, the measured drive gain can be used to detect gas, yet still may result in a highly accurate true vapor pressure value. With more particularity, at the instant that outgassing first occurs, with a few tiny bubbles present, drive gain may not increase past the drive gain threshold line 340 for detection. A dynamic pressure may be increased by, for example, a pump that continues to increase a flow rate until the static pressure drops such that drive gain passes the drive gain threshold line 340. Depending on the application, this calculated static pressure (e.g., an uncorrected vapor pressure) could be corrected (e.g., adjusted—decreased or increased) by a vapor pressure meter factor of, for example, 1 psi, to account for the delay in detecting the fluid phase change. That is, the vapor pressure meter factor could be determined and applied to the uncorrected vapor pressure measurement as a function of drive gain to account for the difference in the drive gain at which the gas is detected and the true vapor pressure so as to detect tiny amounts of gas.

Referring to FIG. 3 by way of example, the measured drive gain of 40 percent may correspond to a static pressure of the fluid in the meter assembly that is, for example, 1 psi less than a static pressure corresponding to the drive gain associated with the true vapor pressure. Accordingly, the vibratory meter 5, or meter electronics 20, or any suitable electronics, can determine that the vapor pressure meter factor is 1 psi and add this value to the static pressure associated with the 40 percent drive gain. As a result, the vibratory meter 5 may accurately detect the phase change of the fluid and, therefore, also accurately determine a vapor pressure of the fluid using the drive gain.

However, other means of detecting the phase change may be employed that do not use a drive gain. For example, the phase change may be detected by acoustic measurement, x-ray-based measurements, optical measurements, etc. Also, combinations of the above implementations could be considered. For example, a bypass line that extends vertically in a loop with acoustic and/or optical measurements distributed vertically to determine where the gas first outgasses. This height would then provide the needed input to calculate a vapor pressure of the fluid in the vibratory meter 5, as the following explains.

Pressure Drop in a Vibratory Meter

Figure 4:
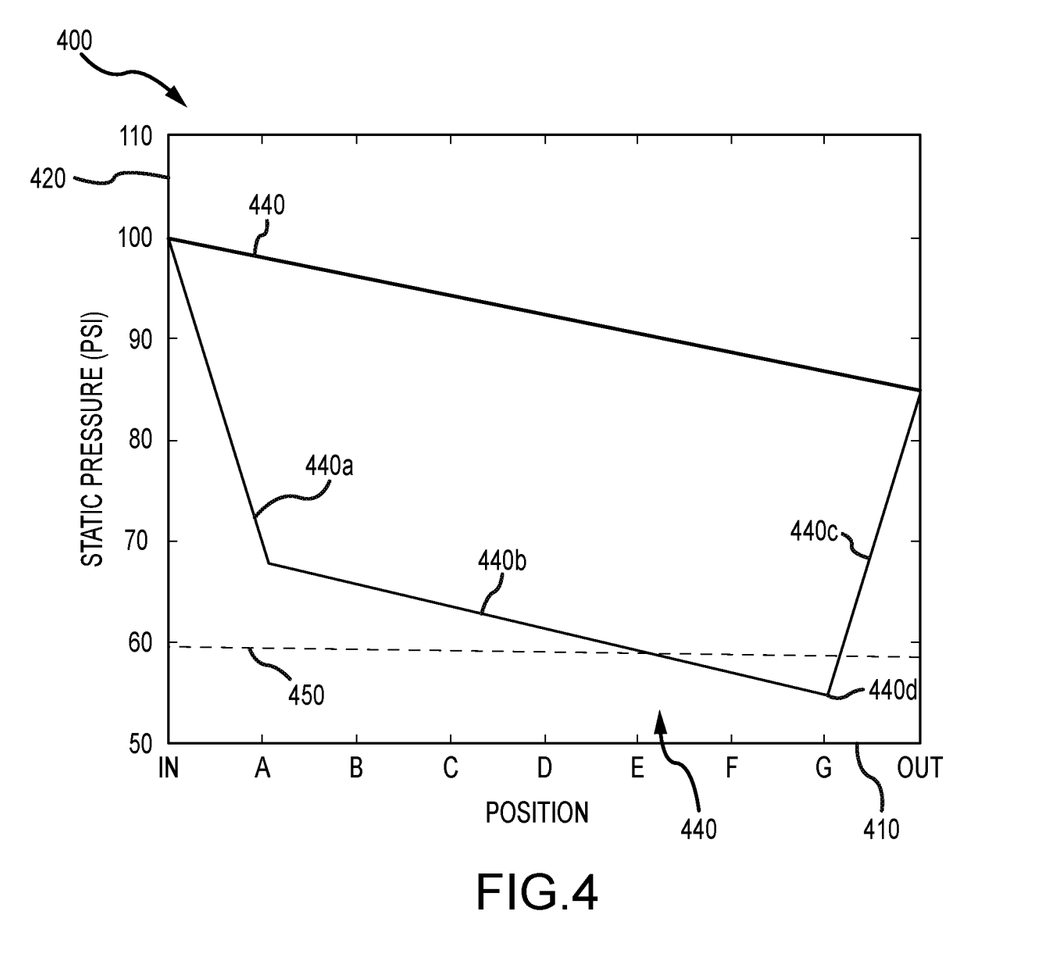
FIG. 4 shows a graph 400 illustrating how a static pressure of a fluid in a vibratory meter may be used to determine a vapor pressure.

FIG. 4 shows a graph 400 illustrating how a static pressure of a fluid in a vibratory meter may be used to determine a vapor pressure. As shown in FIG. 4, graph 400 includes a position axis 410 and a static pressure axis 420. The position axis 410 is not shown with any particular units of length, but could be in units of inches, although any suitable unit may be employed. The static pressure axis 420 is in units of pounds-per-square inch (psi), although any suitable unit may be employed. The position axis 410 ranges from an inlet ("IN") to an outlet ("OUT") of the vibratory meter.

Accordingly, the position from IN to OUT may correspond to fluid in, for example, the meter assembly 10 shown in FIG. 1. In this example, the region from IN to about A may correspond to a portion of the meter assembly 10 between the flange 103 to the conduit mounting block 120. The region from about A to about G may correspond to the conduits 130, 130' between the mounting blocks 120, 120'. The region from G to OUT may correspond to the portion of the meter assembly 10 from the mounting block 120' to the flange 103'. Accordingly, the fluid in the meter assembly 10 (e.g., in the position ranging from IN to OUT) may not include fluid in, for example, the pipeline in which the meter assembly 10 is inserted. The fluid in the meter assembly 10 may be the fluid in the conduits 130, 130'.

The graph 400 also includes a zero dynamic pressure plot 430 and a dynamic pressure change plot 440. The zero dynamic pressure plot 430 shows no change in the dynamic pressure—the pressure is assumed to decrease linearly from an inlet to an outlet of a vibratory meter. The dynamic pressure change plot 440 may represent an actual pressure in the vibratory meter inserted into the pipeline wherein the diameter of the conduit or conduits of the vibratory meter is less than the diameter of the pipeline. An exemplary vibratory meter 5 is shown in FIG. 1, although any suitable vibratory meter may be employed. Accordingly, the fluid in the meter assembly, such as the meter assembly 10 described above, may have a reduced static pressure due to an increase in dynamic pressure. Also shown is a vapor pressure line 450 representing a vapor pressure of the fluid in the vibratory meter.

The dynamic pressure change plot 440 includes a static pressure drop section 440a, a viscous loss section 440b, and a static pressure increase section 440c. The dynamic pressure change plot 440 also includes a minimum static pressure 440d. The static pressure drop section 440a may be due to an increase in fluid velocity causing a corresponding increase in the dynamic pressure of this section of the vibratory meter. The viscous loss section 440b may correspond to a constant diameter portion of the conduit or conduits in the vibratory meter. Accordingly, the viscous loss section 440b may not reflect an increase in fluid velocity and, therefore, may not reflect an increase in a dynamic pressure. The static pressure increase section 440c may be due to a decrease in fluid velocity and, therefore, the static pressure decrease during the static pressure drop section 440a may be recovered. The static pressure drop section 440a and the static pressure increase section 440c may be static pressure changes in the meter assembly.

The portion of the dynamic pressure change plot 440 lying below the vapor pressure line 450, which includes the minimum static pressure 440d, may correspond to positions (e.g., from about position E to slightly after position G) where a fluid phase change occurs in a fluid in a meter assembly, such as the meter assembly 10 described above. As can be seen in FIG. 4, the minimum static pressure 440d is below the vapor pressure line 450. This indicates that the dynamic pressure change plot 440 may be shifted upwards by increasing the static pressure of the fluid in the meter assembly. However, if the static pressure were to be increased by about 5 psi so as to shift the dynamic pressure change plot 440 up until the minimum static pressure 440d lies on the vapor pressure line 450, a fluid phase change may be detected. Because the static pressure is increased, gas or vapor in the fluid in the meter assembly may become a liquid. Conversely, if the dynamic pressure change plot 440 were above the vapor pressure line 450 and the static pressure of the fluid in the meter assembly were decreased until the minimum static pressure 440d lies on the vapor pressure line, then the fluid phase change may be the formation of gas or vapor in the fluid.

As can be seen in FIG. 4, the viscous loss section 440b decreases from a static pressure of about 68 psi at position A to a static pressure of about 55 psi at position G. As can be appreciated, the static pressure of about 55 psi at the position G is less than the vapor pressure line 450, which is about 58 psi. As a result, even though the static pressures at the inlet and outlet are greater than the vapor pressure line 450, the fluid in the vibratory meter may still flash or outgas.

Accordingly, the static pressure at the inlet and outlet do not directly correspond to the vapor pressure of the fluid. In other words, the vapor pressure of the fluid may not be directly determined from a static pressure of the fluid in the pipeline or external of the meter assembly. The static pressure in the meter assembly 10 or, more specifically, the conduits 130, 130', can be accurately determined by, for example, using the pressure measurements at the inlet and the outlet and inputting the dimensions of the vibratory meter 5 (e.g., diameter and length of the conduit 130, 130'). However, to accurately determine the vapor pressure, a phase change in the fluid in the vibratory meter 5 may need to be induced, which may be caused by varying the static pressure of the fluid in the vibratory meter 5.

Varying a Static Pressure of a Fluid

Figure 5:
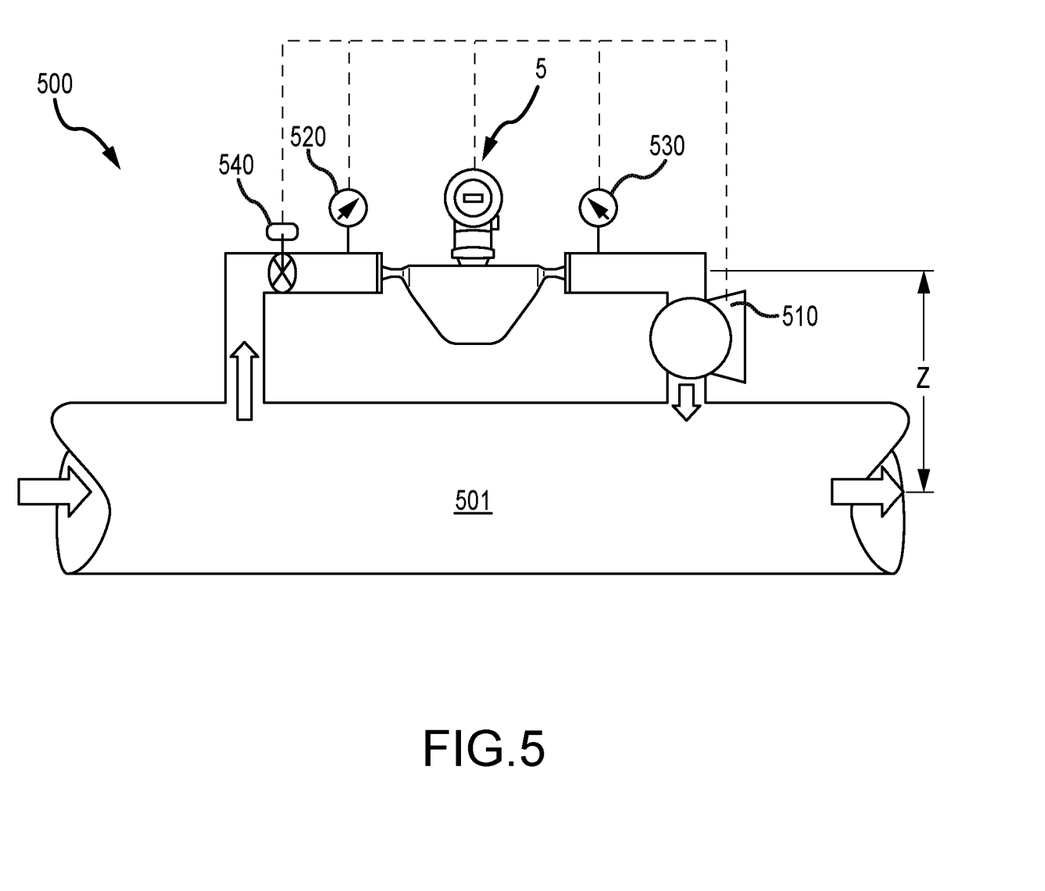
FIG. 5 shows a system 500 for determining a vapor pressure of a fluid.

FIG. 5 shows a system 500 for determining a vapor pressure of a fluid. As shown in FIG. 5, the system 500 is a bypass that includes a bypass inlet and a bypass outlet that are coupled to a pipeline 501. The system 500 includes a pump 510 in fluid communication with an outlet of a vibratory meter 5, illustrated as a Coriolis meter, and the bypass outlet. An inlet pressure sensor 520 is in fluid communication with an inlet of the vibratory meter 5 and the bypass inlet. An outlet pressure sensor 530 is disposed between the outlet of the vibratory meter 5 and the pump 510 and is in configured to measure a static pressure of the fluid at the outlet of the vibratory meter 5. A flow control device 540, which is shown as a valve, is disposed between the bypass inlet and the inlet pressure sensor 520.

The pump 510 may be any suitable pump that can, for example, increase a velocity of the fluid in the vibratory meter 5. The pump 510 may, for example, include a variable frequency drive. The variable frequency drive may allow the pump 510 to control a fluid velocity of the fluid in the system 500. For example, the variable frequency drive may increase the fluid velocity of the fluid through the vibratory meter 5, although the fluid velocity may be increased by any suitable pump. By increasing the fluid velocity, the pump 510 can increase a dynamic pressure of the fluid in the vibratory meter 5 by increasing the fluid velocity.

Accordingly, the static pressure of the fluid in the vibratory meter 5 may decrease. By way of illustration, with reference to FIG. 4, the pump 510 may cause the dynamic pressure change plot 440 to shift downward. Accordingly, although not shown in FIG. 4, should the dynamic pressure change plot 440 be above the vapor pressure line 450, the pump 510 may induce flashing or outgassing by causing the dynamic pressure change plot 440 to shift downward. Similarly, by shifting the dynamic pressure change plot 440 up to or above the vapor pressure line 450, gas or vapor in the fluid may become a liquid.

The inlet pressure sensor 520 and the outlet pressure sensor 530 may be any suitable pressure sensor configured to measure any pressure of the fluid. For example, the inlet pressure sensor 520 and the outlet pressure sensor 530 may measure a static pressure of the fluid in the system 500. Additionally, or alternatively, the inlet pressure sensor 520 and the outlet pressure sensor 530 may measure a total pressure of the fluid in the system 500. In one example, a dynamic pressure of the fluid may be determined by taking a difference between the total pressure and the static pressure of the fluid in the system 500 according to equation [3] above. For example, the inlet pressure sensor 520 may measure the total pressure and the static pressure of the fluid proximate to, or at, an inlet of the vibratory meter 5. The inlet pressure sensor 520 and/or the meter electronics 20 in the vibratory meter 5 may determine the dynamic pressure at the inlet of the vibratory meter 5.

The flow control device 540 may increase the fluid velocity of the fluid in the system 500, when the flow control device 540's position is moved from a partially closed position to a fully open position. For example, by decreasing the flow restriction of the system 500 at the inlet of the vibratory meter 5, the velocity of the fluid may increase in accordance with equation [2] above. This can shift the dynamic pressure change plot 440 down so as to induce flashing or outgassing. Conversely, the flow control device 540 can reduce the fluid velocity of the fluid in the system 500 thereby shifting the dynamic pressure change plot 440 up, thereby causing gas or vapors to condense.

As the flow control device 540 is opened, the fluid velocity will increase, but so will a static pressure at the vibratory meter 5 inlet, and vice versa. The combination of the flow control device 540 with the pump 510 may provide a preferred process condition by partially closing the flow control device 540 (e.g., to restrict a flow and lower pressure downstream of the flow control device 540) and increasing pump speed (e.g., increasing flow rate) to obtain a desirably lower static pressure and higher velocity.

Although the static pressure of the fluid in the vibratory meter 5, or, more particularly, the meter assembly 10 in the vibratory meter 5, may be varied by using the pump 510 or the flow control device 540, or a combination of both, described above, other means of varying the static pressure may be employed. For example, a height z of the vibratory meter 5 may be varied. To reduce the static pressure of the fluid in the vibratory meter 5, the height z may be increased. To increase the static pressure of the fluid in the vibratory meter 5, the height z may be decreased. The height z of the vibratory meter 5 may be varied by any suitable means, such as a motorized lift between the vibratory meter 5 and the pipeline 501 and bellows between the vibratory meter 5, for example, the flow control device 540 and the pump 510. Other means may be employed, as well as a combination of various means (e.g., the pump 510, flow control device 540, and/or the motorized lift).

For example, if the flow rate through a bypass is sufficient, a pump may not necessarily be employed. Only the flow control device 540 may be used. The flow control device 540 may be installed in other locations, such as downstream of the vibratory meter 5. Alternatively, the flow control device 540 may not be employed, such as where the pump 510 and/or motorized lift is used. In another alternative example, the meter may be installed in the main line, rather than a bypass. Additionally, or alternatively, only a single pressure sensor may be employed. For example, only the outlet pressure sensor 530 may be employed. The inlet and/or outlet pressure sensors 520, 530 may be located at alternative locations. The outlet pressure sensor 530 and its location may be beneficial because the static pressure at the location of the outlet pressure sensor 530 may substantially stabilize with respect to fluid velocity once the fluid in the meter assembly 10 is at the vapor pressure. That is, any additional increase in the fluid velocity may not cause a substantial decrease in the static pressure measured by the outlet pressure sensor 530.

True Vapor Pressure and Reid Vapor Pressure

As discussed above, the Coriolis-meter-based system may provide a true vapor pressure at a gas-liquid ratio of 0:1, which may be a more useful parameter for engineering calculations. Additionally, the Coriolis-based system may measure a "live sample," which may still have a component with a low vapor pressure ("light-ends"). This may be a potential benefit when compared to methods that measure using "dead sample" where light-ends are evaporated and lost during sampling. Additionally, safety benefits of eliminating the need of transporting sample containers full of vapor for laboratory analysis may be realized.

As to other vapor pressure measurements, a meter electronics 20 can be configured to back-calculate the Reid vapor pressure at 4:1, or some other V/L ratio using other correlations. For example, to obtain a Reid vapor pressure from true vapor pressure measurements for gasoline, the following equations can be used:

$$A = -A_1 - A_2\ln(TVP) \quad [8]$$

$$B = B_1 - B_2\ln(TVP) \quad [9]$$

$$RVP = \exp\left(A - \frac{B}{T+C}\right) \quad [10]$$

Similarly, to a obtain Reid vapor pressure from true vapor pressure measurements for crude oil, the following equations may be used:

$$A = A_1 - A_2\ln(TVP) - A_3(T+C) \quad [11]$$

$$B = B_1 - B_2\ln(TVP) - B_3[\ln(TVP)]^2 \quad [12]$$

$$RVP = \exp\left(A - \frac{B}{T+C}\right) \quad [13]$$

Where:
T is temperature (° C.);
TVP is a true vapor pressure (kPa);
RVP is a Reid vapor pressure (kPa); and
$A_1, A_2, A_3, B_1, B_2, B_3$, and C are parameters for converting between the Reid vapor pressure and the true vapor pressure, and depend on the composition of the fluid.
By way of example, the conversion parameters $A_1, A_2, A_3, B_1, B_2, B_3$, and C may have the following values (for SI units):

| Parameter | Gasoline | Crude Oil |
|---|---|---|
| A1 | 9.4674 | 16.62 |
| A2 | −0.9445 | 0.9875 |
| B1 | 5211.0 | 5339 |
| B2 | 16.014 | 675.7 |
| C | 459.67 | 273.15 |

An example of the benefit of measuring the vapor pressure at a gas-liquid ratio close to zero can be seen in rail transportation of crude oil. Most vapor pressure testing methods require a gas-liquid ratio of 4:1 and a measuring temperature of 37.8° C. However, crude oil can be transported at 80° C. and gas-liquid ratios close to 0:1. Under these conditions, light-ends might begin to evaporate even in "dead" crude oil and produce a gaseous mixture with exponential pressure increase. This may not be foreseen if the vapor pressure is measured at a gas-liquid ratio of 4:1 and a temperature of 37.8° C. For safety calculations, it may be important to measure the vapor pressure transported in pipelines at process temperature and a gas-liquid ratio close to 0:1, which can be accomplished using a method consistent with the description of FIG. 6, an exemplary one of which is described below.

Using a Vapor Pressure Meter Factor

Figure 6:
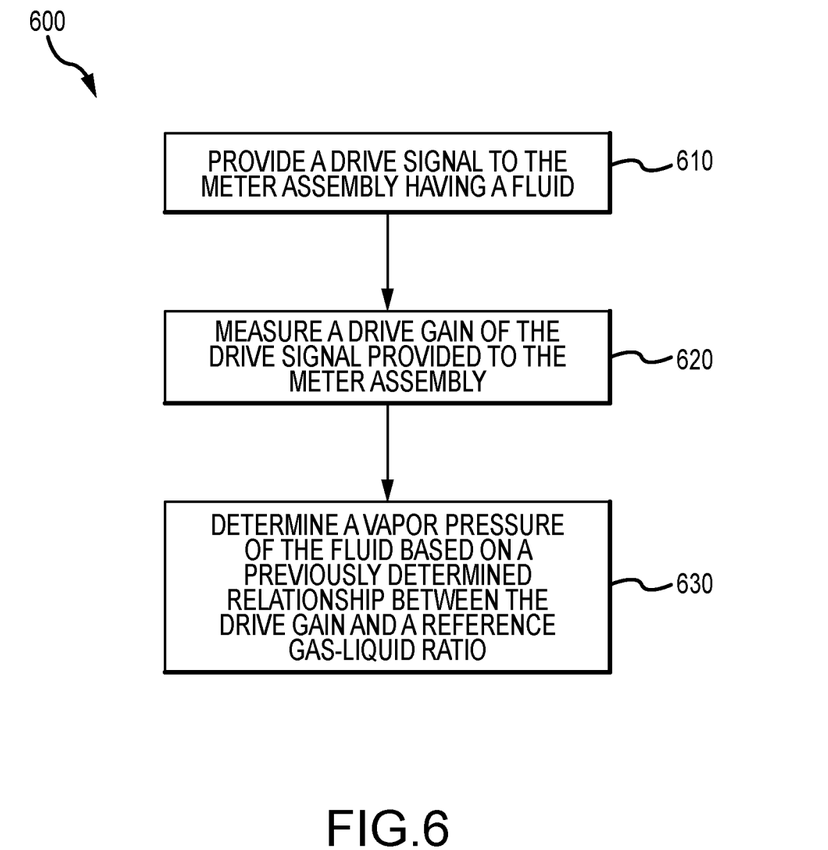
FIG. 6 shows a method 600 of determining a vapor pressure using a vapor pressure meter factor.

FIG. 6 shows a method 600 of determining a vapor pressure using a vapor pressure meter factor. As shown in FIG. 6, the method 600 begins with step 610, which provides a drive signal to a meter assembly having a fluid. The meter assembly employed by the method 600 may be the meter assembly 10 described above although any suitable meter assembly may be employed. In step 620, a drive gain of the drive signal provided to the meter assembly is measured. A vapor pressure of the fluid is determined based on a previously determined relationship between the drive gain and a reference gas-liquid ratio in step 630.

The method 600 may include additional steps. For example, a static pressure may be determined when the drive gain is measured. For example, the static pressure may be determined contemporaneous to when the drive gain is measured. As described above with reference to FIG. 3, the measured drive gain may be associated with a drive gain threshold for detecting a phase change, such as the drive gain threshold line 340. When the drive gain is measured at the drive gain threshold, the method 600 may also determine a static pressure of the fluid in the meter assembly. Accordingly, the measured static pressure may be an uncorrected vapor pressure. This uncorrected vapor pressure may be adjusted using a vapor pressure meter factor to determine a true vapor pressure.

In step 610, the drive signal may be provided by the meter electronics 20 described above, although any suitable electronics may be employed. The fluid may or may not have a gas or vapor, such as entrained gas, bubbles, slug flow, or the like. A velocity of the fluid may vary due to, for example, a pump in line with the vibratory meter 5 although any suitable configuration may be employed. By varying the velocity of the fluid in the meter assembly, the static pressure of the fluid in the meter assembly may increase or decrease. For example, increasing the velocity of the fluid may decrease the static pressure of the fluid in the meter assembly.

The previously determined relationship between the drive gain and the reference gas-liquid ratio may be a direct relationship or an indirect relationship. For example, a direct previously determined relationship between the drive gain and the reference gas-liquid ratio may be a linear relationship that relates a drive gain to a gas-liquid ratio over a range. The range may be from a drive gain associated with a true vapor pressure to a drive gain of 100 percent. In an example, the drive gain associated with the true vapor pressure may be about 10 percent, although any suitable value may be employed.

In an exemplary indirect relationship, the reference gas-liquid ratio may be associated with a static pressure, which is subtracted from by the vapor pressure meter factor. The vapor pressure meter factor may therefore also be associated with a drive gain threshold associated with an uncorrected vapor pressure. Accordingly, a value of the gas-liquid ratio may not necessarily be used to calculate the vapor pressure, such as a true vapor pressure, but the previously determined relationship between the drive gain and the gas liquid-ratio may nevertheless be a basis for determining a vapor pressure.

Figure 7:
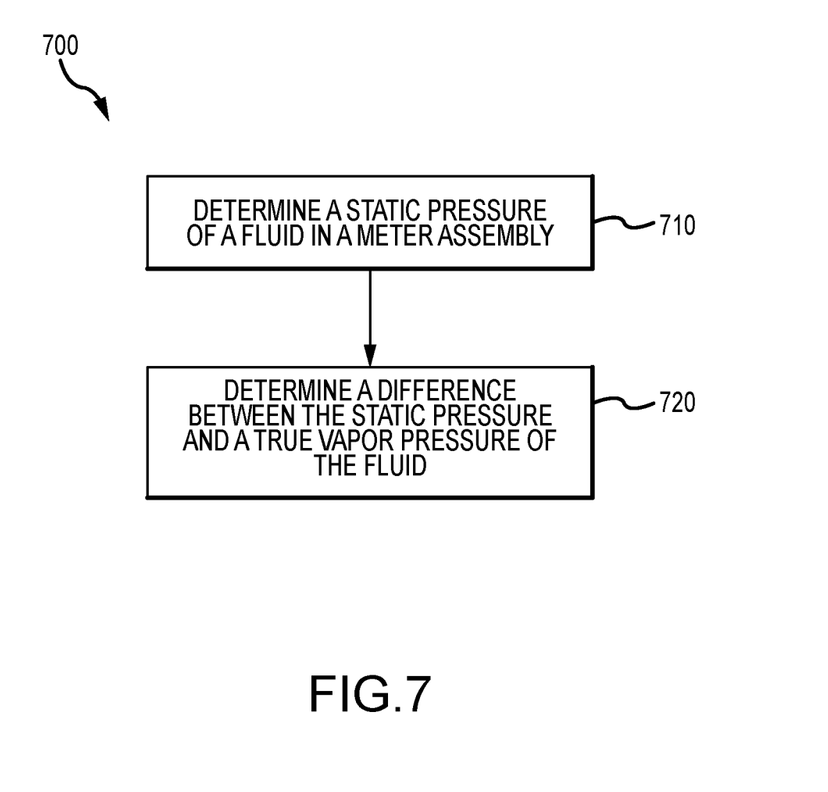
FIG. 7 shows a method 700 of determining a vapor pressure meter factor for determining a vapor pressure.

FIG. 7 shows a method 700 of determining a vapor pressure meter factor for determining a vapor pressure. As shown in FIG. 7, the method 700, in step 710, determines a static pressure of a fluid in a meter assembly. In step 720, the method 700 determines a difference between the static pressure and a true vapor pressure of the fluid.

The method 700 may further include providing a signal to the meter assembly, measuring a drive gain of the drive signal provided to the meter assembly, and/or associating the static pressure of the fluid in the meter assembly with the drive gain. Additionally or alternatively, the method 700 may include associating a drive gain threshold for detecting a phase change in the fluid with a measured drive gain, and associating the difference with the drive gain threshold.

The above describes the vibratory meter 5, in particular the meter electronics 20, and method 600 that determine a vapor pressure using a vapor pressure meter factor. By using the vapor pressure meter factor, a threshold, such as the drive gain threshold line 340, may be accounted for. More specifically, a vapor pressure value associated with the drive gain threshold line 340 may be corrected by the vapor pressure meter factor to obtain a true vapor pressure value. The true vapor pressure value may correspond to where a phase change occurs in a fluid, but there is no vapor in the fluid. Accordingly, the determined vapor pressure may be more accurate. As a result, the operation of the vibratory meter 5 and the meter electronics 20 is improved because the values provided by the vibratory meter 5 and meter electronics 20 are more accurate. More accurate measurements in the technical field of vapor pressure measurements can improve other technical fields, such as fluid process controls, or the like.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other ways of determining the vapor pressure using the vapor pressure meter factor and not just to the embodiments described above and shown in the accompanying figures. Accordingly, the scope of the embodiments described above should be determined from the following claims.

We claim:

1. A meter electronics (20) for determining a vapor pressure using a vapor pressure meter factor, the meter electronics (20) comprising:
    a processing system (200) communicatively coupled to a meter assembly (10), the processing system (200) being configured to:
    provide a drive signal to the meter assembly (10) having a fluid;
    measure a drive gain of the drive signal provided to the meter assembly (10); and
    determine a vapor pressure value of the fluid based on a previously determined relationship between the drive gain and a reference gas-liquid ratio.

2. The meter electronics (20) of claim 1, wherein the meter electronics (20) is further configured to determine a static pressure value of a fluid in the meter assembly (10) contemporaneous to when the drive gain is measured.

3. The meter electronics (20) of claim 1, wherein the vapor pressure value is determined using the measured drive gain and the previously determined relationship between the drive gain and the reference gas-liquid ratio.

4. The meter electronics (20) of claim 1, wherein the previously determined relationship between the drive gain and the reference gas-liquid ratio is a linear function relating a 100 percent drive gain and a true vapor pressure drive gain.

5. The meter electronics (20) of claim 1, wherein at least one of the reference gas-liquid ratio and the measured drive gain is associated with a predetermined threshold for detection of a fluid phase change.

6. The meter electronics (20) of claim 1, wherein the determined vapor pressure value is a true vapor pressure value.

7. The meter electronics (20) of claim 6, wherein the meter electronics (20) is further configured to use the true vapor pressure value to determine a Reid vapor pressure value.

8. A method of determining a vapor pressure using a vapor pressure meter factor, the method comprising:
    providing a drive signal to the meter assembly having a fluid;
    measuring a drive gain of the drive signal provided to the meter assembly; and
    determining a vapor pressure value of the fluid based on a previously determined relationship between the drive gain and a reference gas-liquid ratio.

9. The method of claim 8, further comprising determining a static pressure value of a fluid in the meter assembly contemporaneous to when the drive gain is measured.

10. The method of claim 8, wherein the vapor pressure value is determined using the measured drive gain and the previously determined relationship between the drive gain and the reference gas-liquid ratio.

11. The method of claim 8, wherein the previously determined relationship between the drive gain and the reference gas-liquid ratio is a linear function relating a 100 percent drive gain and a true vapor pressure drive gain.

12. The method of claim 8, wherein at least one of the reference gas-liquid ratio and the measured drive gain is associated with a predetermined threshold for detection of a fluid phase change.

13. The method of claim 8, wherein the determined vapor pressure value is a true vapor pressure value.

14. The method of claim 13, further comprising using the true vapor pressure value to determine a Reid vapor pressure value.

15. A method of determining a vapor pressure meter factor for determining a vapor pressure, the method comprising:
    determining a static pressure value of a fluid in a meter assembly;
    determining a difference between the static pressure value and a true vapor pressure value of the fluid; and
    associating the difference with a signal threshold.

16. The method of claim 15, further comprising:
    providing a drive signal to the meter assembly;
    measuring a drive gain of the drive signal provided to the meter assembly; and
    wherein associating the difference with the signal threshold comprises associating the static pressure value of the fluid in the meter assembly with the drive gain.

17. The method of claim 15, further comprising:
    associating a drive gain threshold for detecting a phase change in the fluid with a measured drive gain; and
    associating the difference with the drive gain threshold.

* * * * *